(12) United States Patent
Hwang et al.

(10) Patent No.: US 8,986,156 B1
(45) Date of Patent: Mar. 24, 2015

(54) PLANETARY GEAR TRAIN OF AUTOMATIC TRANSMISSION FOR VEHICLES

(71) Applicant: Hyundai Motor Company, Seoul (KR)

(72) Inventors: Seong Wook Hwang, Gunpo-si (KR); Wonmin Cho, Hwaseong-si (KR); Kangsoo Seo, Yongin-si (KR); Jae Chang Kook, Hwaseong-si (KR); Won-Jun Sung, Seoul (KR); Myeong Hoon Noh, Seongnam-si (KR); Seongwook Ji, Ansan-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/473,405

(22) Filed: Aug. 29, 2014

(30) Foreign Application Priority Data

Nov. 27, 2013 (KR) ........................ 10-2013-0145217

(51) Int. Cl.
*F16H 3/44* (2006.01)
*F16H 3/46* (2006.01)

(52) U.S. Cl.
CPC ............ *F16H 3/46* (2013.01); *F16H 2200/006* (2013.01); *F16H 2200/2007* (2013.01); *F16H 2200/2041* (2013.01)
USPC ....................................................... 475/286

(58) Field of Classification Search
USPC ............. 475/286, 330, 329, 343, 218, 219, 5, 475/207, 221, 317, 318, 303, 214, 272, 288, 475/302
See application file for complete search history.

(56) References Cited

U.S. PATENT DOCUMENTS

| | | | | |
|---|---|---|---|---|
| 6,213,909 B1 * | 4/2001 | Raghavan | ...................... | 475/282 |
| 7,637,840 B2 * | 12/2009 | Ziemer | ........................ | 475/286 |
| 7,682,281 B2 * | 3/2010 | Ziemer | ........................ | 475/275 |
| 8,231,491 B2 * | 7/2012 | Oba et al. | ........................... | 475/5 |
| 8,597,149 B2 * | 12/2013 | Potter | ........................... | 475/219 |
| 8,777,789 B2 * | 7/2014 | Potter | ............................. | 475/5 |
| 8,845,478 B2 * | 9/2014 | Oguri | ............................ | 475/285 |
| 2007/0093341 A1 * | 4/2007 | Supina et al. | ..................... | 475/5 |
| 2010/0190602 A1 * | 7/2010 | Wittkopp et al. | ............. | 475/303 |
| 2011/0124463 A1 * | 5/2011 | Sugino | .......................... | 475/296 |

FOREIGN PATENT DOCUMENTS

| | | |
|---|---|---|
| JP | 2998941 B2 | 11/1999 |
| JP | 2005-23987 A | 1/2005 |
| KR | 10-1172304 B1 | 8/2012 |

\* cited by examiner

*Primary Examiner* — Saul Rodriguez
*Assistant Examiner* — David J Hlavka
(74) *Attorney, Agent, or Firm* — Morgan, Lewis & Bockius LLP

(57) ABSTRACT

A planetary gear train may include an input shaft, an output shaft, a first planetary gear set, a second planetary gear set, a first rotation shaft directly connected to one rotation element of the first planetary gear set and one rotation element of the second planetary gear set, and selectively connected to the input shaft, a second rotation shaft directly connected to another rotation element of the second planetary gear set and directly connected to the output shaft, a third rotation shaft directly connected to another rotation element of the first planetary gear set and the other rotation element of the second planetary gear set, and selectively connected to the input shaft or to a transmission housing, and a fourth rotation shaft directly connected to the other rotation element of the first planetary gear set, and selectively connected to the input shaft through two paths or to the transmission housing.

16 Claims, 4 Drawing Sheets

FIG. 3

|  | C1 | C2 | B1 | B2 | DC |
|---|---|---|---|---|---|
| 1ST | ● |  | ● |  | neutral |
| 2ND | ● |  |  | ● | neutral |
| 3RD | ● |  |  |  | S1 |
| 4TH | ● |  |  |  | S2 |
| 5TH | ● | ● |  |  | neutral |
| 6TH |  | ● |  |  | S2 |
| 7TH |  | ● |  |  | S1 |
| 8TH |  | ● |  | ● | neutral |
| REV |  |  | ● |  | S2 | ns
PLANETARY GEAR TRAIN OF AUTOMATIC TRANSMISSION FOR VEHICLES

CROSS-REFERENCE TO RELATED APPLICATION

The present application claims priority to and the benefit of Korean Patent Application No. 10-2013-0145217 filed on Nov. 27, 2013, the entire contents of which is incorporated herein for all purposes by this reference.

BACKGROUND OF THE INVENTION

1. Field of the Invention

The present invention relates to an automatic transmission for a vehicle. More particularly, the present invention relates to a planetary gear train of an automatic transmission for a vehicle that can improve power delivery performance and reduce fuel consumption at a low-speed driving.

2. Description of Related Art

Typically, multiple-shift mechanism of an automatic transmission is achieved by combining a plurality of planetary gear sets and a plurality of frictional elements. It is well known that when a planetary gear train realizes a greater number of shift speeds, speed ratios of the planetary gear train can be more optimally designed, and therefore a vehicle can have economical fuel mileage and better performance. For that reason, the planetary gear train that is able to realize more shift speeds is under continuous investigation.

Though achieving the same number of speeds, the planetary gear train has a different operating mechanism according to a connection between rotation elements (i.e., sun gear, planet carrier, and ring gear). In addition, the planetary gear train has different features such a durability, power delivery efficiency, and size depend on the layout thereof. Therefore, designs for a combining structure of a gear train are also under continuous investigation.

If the number of shift-speeds, however, increases, the number of components in the automatic transmission also increases. Therefore, mountability, cost, weight and power delivery efficiency may be deteriorated.

Particularly, since the planetary gear train having a number of components is hard to be mounted in a front wheel drive vehicle, researches for minimizing the number of components have been developed.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle having advantages of achieving eight forward speeds and one reverse speed by disposing first and second planetary gear sets on an output shaft and connecting rotation elements of the first and second planetary gear sets to an input shaft through a plurality of transfer gears.

In addition, various aspects of the present invention are directed to providing a planetary gear train of an automatic transmission for a vehicle having further advantages of enabling of setting optimum gear ratios due to ease of changing gear ratios by using the plurality of transfer gears, and accordingly improving power delivery performance and fuel economy at a low-speed driving.

A planetary gear train of an automatic transmission for a vehicle according to an exemplary embodiment of the present invention may include, an input shaft receiving torque, an output shaft disposed in parallel with and apart from the input shaft, a first planetary gear set having three rotation elements, a second planetary gear set having three rotation elements, a first rotation shaft directly connected to one rotation element of the first planetary gear set and one rotation element of the second planetary gear set, and selectively connected to the input shaft, a second rotation shaft directly connected to another rotation element of the second planetary gear set and directly connected to the output shaft. a third rotation shaft directly connected to another rotation element of the first planetary gear set and the other rotation element of the second planetary gear set, and selectively connected to the input shaft or to a transmission housing, and, a fourth rotation shaft directly connected to the other rotation element of the first planetary gear set, and selectively connected to the input shaft through two paths or to the transmission housing.

The planetary gear train may further include three transfer gears disposed respectively between the input shaft and the first and third rotation shafts and on the two paths.

The planetary gear train may further include a dog clutch selectively transmitting torque of the input shaft to any one of the two paths or not transmitting either of the two paths.

Each of the first and second planetary gear sets may be a single pinion planetary gear set.

The first rotation shaft may be connected to a first sun gear of the first planetary gear set and a second sun gear of the second planetary gear set, the second rotation shaft may be connected to a second planet carrier of the second planetary gear set, the third rotation shaft may be connected to a first planet carrier of the first planetary gear set and a second ring gear of the second planetary gear set, and the fourth rotation shaft may be connected to a first ring gear of the first planetary gear set.

The three transfer gears may include, a first transfer gear disposed between the input shaft and the first and third rotation shafts, a second transfer gear disposed on a first path of the two paths, and a third transfer gear disposed on a second path of the two paths.

Gear ratios of the three transfer gears may be different from each other.

The planetary gear train may further include, a first clutch disposed between the first transfer gear and the first rotation shaft, a second clutch disposed between the first transfer gear and the third rotation shaft, a first brake disposed between the third rotation shaft and the transmission housing, and. a second brake disposed between the fourth rotation shaft and the transmission housing.

The first, second and third transfer gears and the first and second clutches may be disposed at one side of the first planetary gear set, and the first and second brakes may be disposed at the other side of the first planetary gear set.

A planetary gear train of an automatic transmission for a vehicle according to another exemplary embodiment of the present invention may include, an input shaft receiving torque, an output shaft disposed in parallel with and apart from the input shaft, a first planetary gear set including a first sun gear, a first planet carrier, and a first ring gear as rotation elements thereof, a second planetary gear set including a second sun gear, a second planet carrier, and a second ring gear as rotation elements thereof and disposed adjacent to the first planetary gear set, a first rotation shaft directly connected to the first sun gear and the second sun gear and selectively connected to the input shaft, a second rotation shaft directly connected to the second planet carrier and directly connected to the output shaft. a third rotation shaft directly connected to the first planet carrier and the second ring gear, and selectively connected to the input shaft or to a transmission housing. a fourth rotation shaft directly connected to the first ring gear and selectively connected to the input shaft or to the transmission housing, and a dog clutch selectively connecting the input shaft to the fourth rotation shaft through two paths.

Each of the first and second planetary gear sets may be a single pinion planetary gear set.

The planetary gear train may further include, a first transfer gear disposed between the input shaft and the first and third rotation shafts, a second transfer gear disposed on a first path of the two paths, and a third transfer gear disposed on a second path of the two paths.

Gear ratios of the three transfer gears may be different from each other.

The planetary gear train may further include, a first clutch disposed between the first transfer gear and the first rotation shaft. a second clutch disposed between the first transfer gear and the third rotation shaft, a first brake disposed between the third rotation shaft and the transmission housing, and a second brake disposed between the fourth rotation shaft and the transmission housing.

The first, second and third transfer gears and the first and second clutches may be disposed at one side of the first planetary gear set, and the first and second brakes may be disposed at the other side of the first planetary gear set.

The dog clutch may be adapted to selectively transmit torque of the input shaft to any one of the two paths or not to transmit either of the two paths.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 3 is an operational chart of friction elements at each shift-speed applied to a planetary gear train according to an exemplary embodiment of the present invention.

Figure 1:
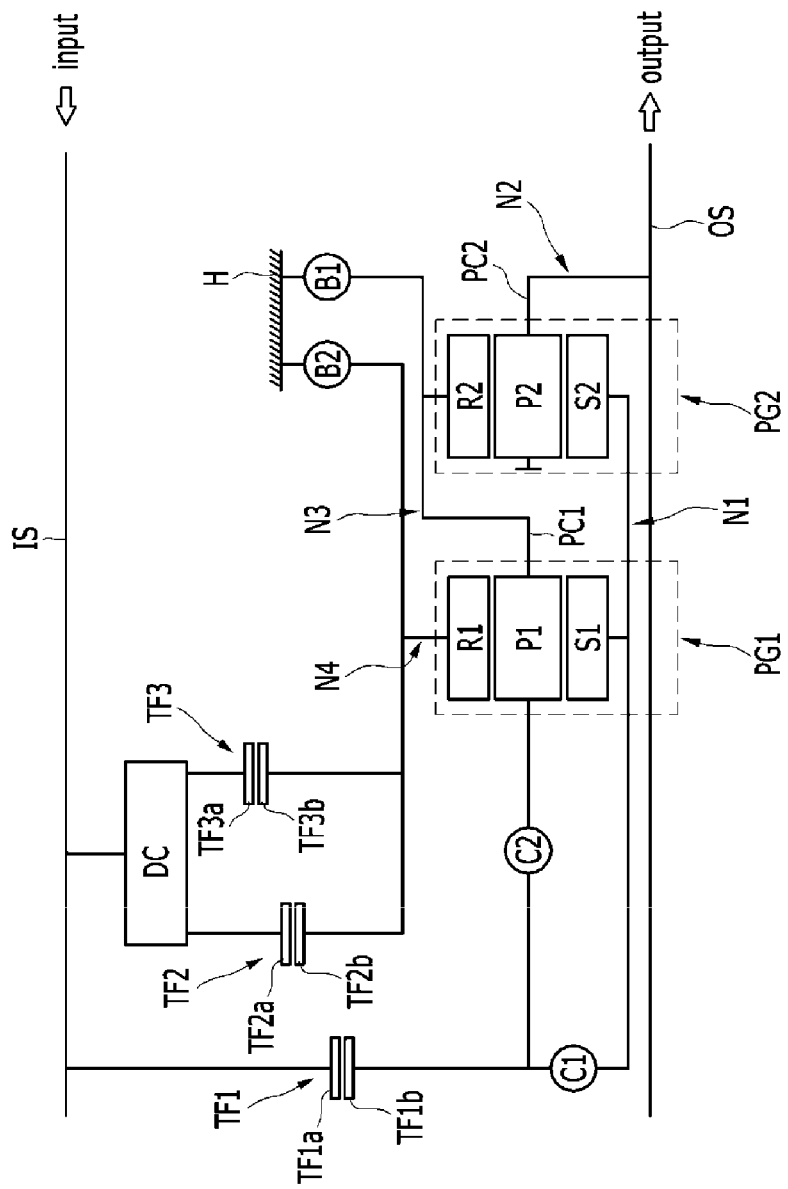
FIG. 1 is a schematic diagram of a planetary gear train according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Description of components that are not necessary for explaining the present exemplary embodiment will be omitted, and the same constituent elements are denoted by the same reference numerals in this specification.

In the detailed description, ordinal numbers are used for distinguishing constituent elements having the same terms, and have no specific meanings.

FIG. 1 is a schematic diagram of a planetary gear train according to an exemplary embodiment of the present invention.

Referring to FIG. 1, a planetary gear train according to an exemplary embodiment of the present invention includes an input shaft IS receiving torque of an engine, an output shaft OS disposed in parallel with and apart from the input shaft IS, first and second planetary gear sets PG1 and PG2 disposed on the output shaft OS, three transfer gears TF1, TF2, and TF3, a dog clutch DC, and frictional elements including two clutches C1 and C2 and two brakes B1 and B2.

Therefore, torque input from the input shaft IS is converted into eight forward speeds and one reverse speed by cooperation of the first and second planetary gear sets PG1 and PG2, and is then output through the output shaft OS.

The input shaft IS is an input member and receives torque from a crankshaft of the engine.

The output shaft OS drives a driving shaft including a driving wheel through a final reduction gear and a differential apparatus.

The first and second planetary gear sets PG1 and PG2 are disposed on the output shaft OS and are combined with each other to include four rotation shafts N1, N2, N3, and N4.

The first planetary gear set PG1 is a single pinion planetary gear set, and includes a first sun gear S1, a first planet carrier PC1 rotatably supporting a first pinion P1 externally meshed with the first sun gear S1, and a first ring gear R1 internally meshed with as rotation elements thereof.

The second planetary gear set PG2 is a single pinion planetary gear set, and includes a second sun gear S2, a second planet carrier PC2 rotatably supporting a second pinion P2 externally meshed with the second sun gear S2, and a second ring gear R2 internally meshed with the second pinion P2 as rotation elements thereof.

The first sun gear S1 is directly connected to the second sun gear S2, the first planet carrier PC1 is directly connected to the second ring gear R2 such that the first and second planetary gear sets PG1 and PG2 are operated as a compound planetary gear set including four rotation shafts N1, N2, N3, and N4.

The first rotation shaft N1 is directly connected to the first sun gear S1 and the second sun gear S2, and is selectively connected to the input shaft IS.

The second rotation shaft N2 is directly connected to the second planet carrier PC2 and is directly connected to the output shaft OS to be always operated as an output element.

The third rotation shaft N3 is directly connected to the first planet carrier PC1 and the second ring gear R2, and is selectively connected to the input shaft IS or to a transmission housing H.

The fourth rotation shaft N4 is directly connected to the first ring gear R1 and is selectively connected to the input shaft IS through two paths or to the transmission housing H.

The first, second, and third transfer gears TF1, TF2, and TF3 respectively have first, second, and third transfer drive gears TF1a, TF2a, and TF3a and first, second, and third transfer driven gears TF1b, TF2b, and TF3b externally meshed with each other.

In addition, gear ratios of the first, second and third transfer gears TF1, TF2, and TF3 may be set according to target speed ratios. For example, the gear ratio of the second transfer gear TF2 is greater than that of the first transfer gear TF1 and is smaller than that of the third transfer gear TF3.

Connections of the first, second, and third transfer gears TF1, TF2, and TF3 will be described in detail.

The first transfer gear TF1 connects the first rotation shaft N1 and the third rotation shaft N3 to the input shaft IS. That is, the first transfer drive gear TF1a is connected to the input shaft IS and the first transfer driven gear TF1b is connected to the first rotation shaft N1 and the third rotation shaft N3.

The second transfer gear TF2 connects the fourth rotation shaft N4 to the input shaft IS. That is, the second transfer drive gear TF2a is connected to the input shaft IS and the second transfer driven gear TF2b is connected to the fourth rotation shaft N4.

The third transfer gear TF3 connects the fourth rotation shaft N4 to the input shaft IS. That is, the third transfer drive gear TF3a is connected to the input shaft IS and the third transfer driven gear TF3b is connected to the fourth rotation shaft N4.

The dog clutch DC is widely used in a manual transmission and is well known to a person of an ordinary skill in the art. The dog clutch DC selectively transmits torque of the input shaft IS to the second transfer gear TF2 or the third transfer gear TF3, or does not transmit the torque of the input shaft IS to either of the second and the third transfer gears TF2 and TF3.

In addition, two clutches C1 and C2 connecting selected rotation shafts to the input shaft IS and two brakes B1 and B2 connecting selected rotation shafts to the transmission housing H are disposed as follows.

The first clutch C1 is disposed between the first transfer driven gear TF1b of the first transfer gear TF1 and the first rotation shaft N1.

The second clutch C2 is disposed between the first transfer driven gear TF1b of the first transfer gear TF1 and the third rotation shaft N3.

The first brake B1 is disposed between the third rotation shaft N3 and the transmission housing H.

The second brake B2 is disposed between the fourth rotation shaft N4 and the transmission housing H.

The frictional elements including the first and second clutches C1 and C2 and the first and second brakes B1 and B2 are conventional multi-plate friction elements of wet type that are operated by hydraulic pressure.

The first, second, and third transfer gears TF1, TF2, and TF3 are disposed at one side of the first planetary gear set PG1.

In addition, the first and second clutches C1 and C2 are disposed at the one side of the first planetary gear set PG1, and the first and second brakes B1 and B2 are disposed at the other side of the first planetary gear set PG1.

Figure 2:
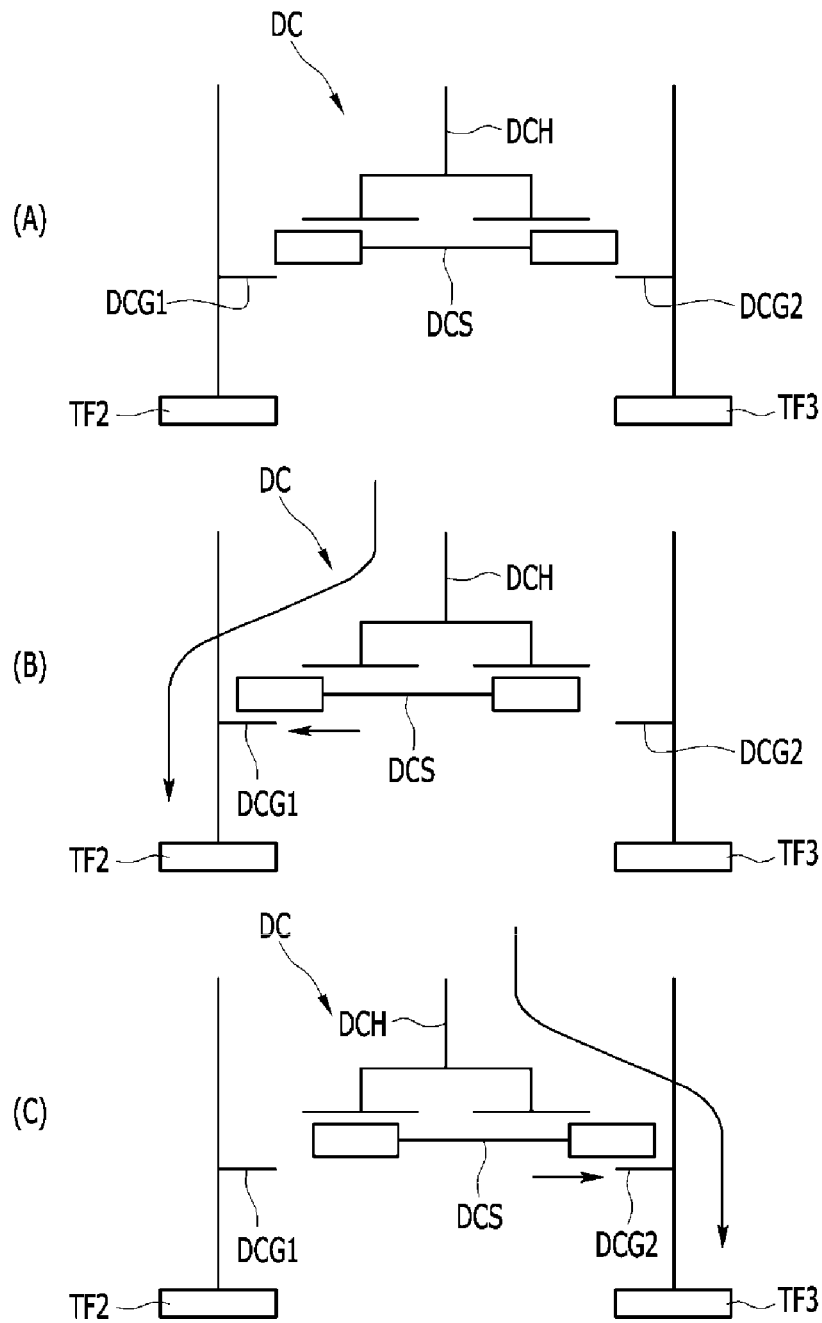
FIG. 2 is a drawing for illustrating operation of a dog clutch used in a planetary gear train according to an exemplary embodiment of the present invention.

FIG. 2 is a drawing for illustrating operation of a dog clutch used in a planetary gear train according to an exemplary embodiment of the present invention.

Referring to FIG. 2, the dog clutch DC includes a dog clutch hub DCH, a dog clutch sleeve DCS, and first and second dog clutch gears DCG1 and DCG2.

The dog clutch hub DCH is directly connected to the input shaft IS and always receive the torque of the input shaft IS.

The dog clutch sleeve DCS is splined to an exterior circumferential portion of the dog clutch hub DCH to be slidable in an axial direction, and moves in the axial direction by an actuator.

The first and second dog clutch gears DCG1 and DCG2 are directly connected respectively to the second and third transfer gears TF2 and TF3. The first and second dog clutch gears DCG1 and DCG2 are selectively engaged with the dog clutch sleeve DCS and selectively receive the torque of the input shaft IS.

Since the dog clutch DC is well known to a person of an ordinary skill in the art, detailed description thereof will be omitted.

FIG. 2A illustrates the dog clutch DC at a neutral state. As shown in FIG. 2A, the dog clutch sleeve DCS is poisoned at the center and is not engaged to neither of the first and second dog clutch gears DCG1 and DCG2 at the neutral state.

FIG. 2B illustrates that the torque of the input shaft IS is transmitted to the second transfer gear TF2. As shown in FIG. 2B, when the dog clutch sleeve DCS moves to the left in the drawings by the actuator, the dog clutch hub DCH and the first dog clutch gear DCG1 are operably connected.

In this case, the torque of the input shaft IS is transmitted to the second transfer gear TF2 through the dog clutch DC.

FIG. 2C illustrates that the torque of the input shaft IS is transmitted to the third transfer gear TF3. As shown in FIG. 2C, when the dog clutch sleeve DCS moves to the right in the drawings by the actuator, the dog clutch hub DCH and the second dog clutch gear DCG2 are operably connected.

In this case, the torque of the input shaft IS is transmitted to the third transfer gear TF3 through the dog clutch DC.

FIG. 3 is an operational chart of friction elements at each shift-speed applied to a planetary gear train according to an exemplary embodiment of the present invention.

Referring to FIG. 3, two frictional elements or one frictional element and the dog clutch DC are operated at each shift-speed according to the exemplary embodiment of the present invention.

The first clutch C1 and the first brake B1 are operated and the dog clutch DC stays at the neutral state at a first forward speed 1ST.

The first clutch C1 and the second brake B2 are operated and the dog clutch DC stays at the neutral state at a second forward speed 2ND.

The first clutch C1 is operated and the dog clutch DC is operably connected to the third transfer gear TF3 at a third forward speed 3RD.

The first clutch C1 is operated and the dog clutch DC is operably connected to the second transfer gear TF2 at a fourth forward speed 4TH.

The first clutch C1 and the second clutch C2 are operated and the dog clutch DC stays at the neutral state at a fifth forward speed 5TH.

The second clutch C2 is operated and the dog clutch DC is operably connected to the second transfer gear TF2 at a sixth forward speed 6TH.

The second clutch C2 is operated and the dog clutch DC is operably connected to the third transfer gear TF3 at a seventh forward speed 7TH.

The second clutch C2 and the second brake B2 are operated and the dog clutch DC stays at the neutral state at an eighth forward speed 8TH.

The first brake B1 is operated and the dog clutch DC is operably connected to the second transfer gear TF2 at a reverse speed REV.

Figure 4:
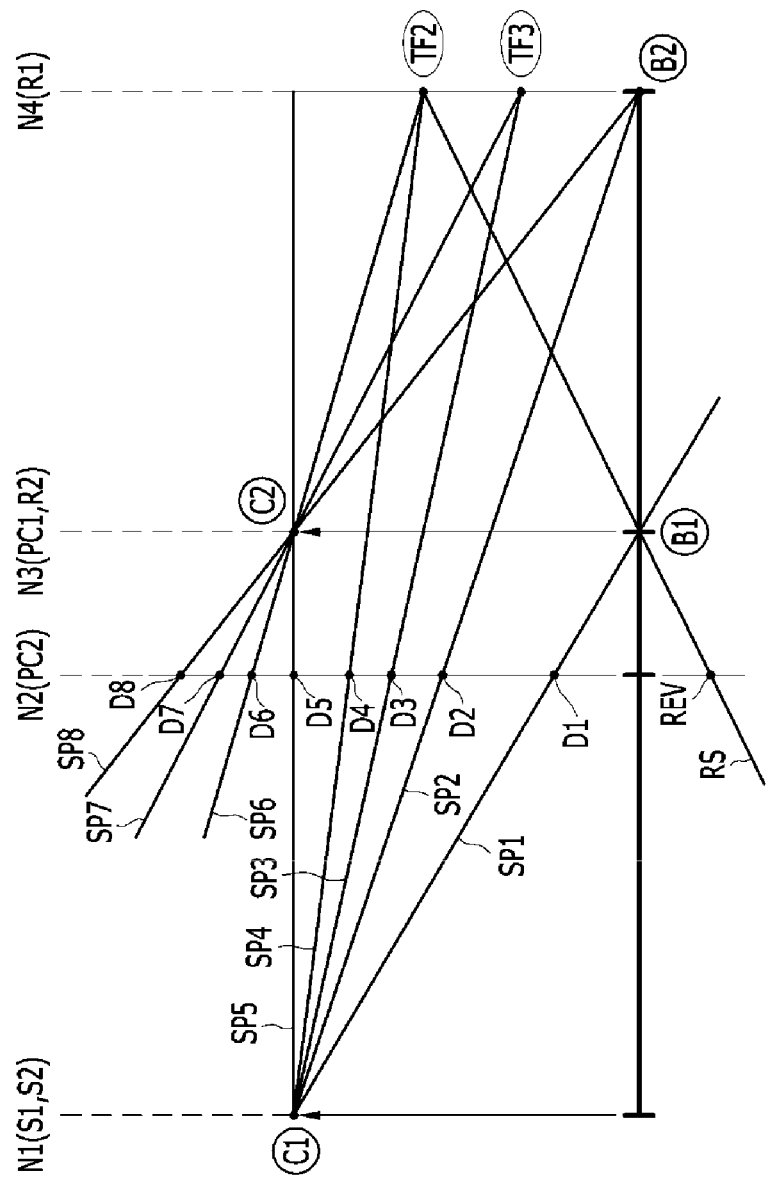
FIG. 4 is a lever diagram of a planetary gear train according to an exemplary embodiment of the present invention.

FIG. 4 is a lever diagram of a planetary gear train according to the exemplary embodiment of the present invention and illustrates shift processes of the planetary gear train according to the exemplary embodiment of the present invention by lever analysis method.

Referring to FIG. 4, four vertical lines of the first and second planetary gear sets PG1 and PG2 are set as the first, second, third, and fourth rotation shafts N1, N2, N3, and N4 from the left to the right. In addition, a lower horizontal line represents a rotation speed of "0", an upper portion of the horizontal line represents positive rotation speed, and a lower portion of the horizontal line represents negative rotation speed.

At this time, although rotation speed input to each rotation shaft is negative rotation speed, for better comprehension and ease of description, it is illustrates that positive rotation speed is input to each rotation shaft.

Hereinafter, referring to FIG. 3 and FIG. 4, the shift processes of the planetary gear train according to the exemplary embodiment of the present invention will be described in detail.

[First Forward Speed]

Referring to FIG. 3, the first clutch C1 and the first brake B1 are operated and the dog clutch DC stays at the neutral state at the first forward speed 1ST.

As shown in FIG. 4, since the dog clutch DC stays at the neutral state, the torque of the input shaft IS is not input to the fourth rotation shaft N4 and is input to the first rotation shaft N1 through the first transfer gear TF1 by operation of the first clutch C1. In addition, the third rotation shaft N3 is stopped by operation of the first brake B1.

Therefore, the rotation shafts form a first shift line SP1 and D1 is output through the second rotation shaft N2 that is the output element.

[Second Forward Speed]

The first brake B1 that was operated at the first forward speed 1ST is released and the second brake B2 is operated at the second forward speed 2ND.

In this case, since the dog clutch DC stays at the neutral state, the torque of the input shaft IS is not input to the fourth rotation shaft N4 and is input to the first rotation shaft N1 through the first transfer gear TF1 by operation of the first clutch C1. In addition, the fourth rotation shaft N4 is stopped by operation of the second brake B2.

Therefore, the rotation shafts form a second shift line SP2 and D2 is output through the second rotation shaft N2 that is the output element.

[Third Forward Speed]

The second brake B2 that was operated at the second forward speed 2ND is released and the dog clutch DC is operably connected to the third transfer gear TF3 at the third forward speed 3RD.

In this case, the torque of the input shaft IS is input to the first rotation shaft N1 through the first transfer gear TF1 by operation of the first clutch C1 and is input to the fourth rotation shaft N4 through the third transfer gear TF3.

Therefore, the rotation shafts form a third shift line SP3 by the gear ratios of the first transfer gear TF1 and the third transfer gear TF3, and D3 is output through the second rotation shaft N2 that is the output element.

[Fourth Forward Speed]

If the dog clutch DC is released from the third transfer gear TF3 and is operably connected to the second transfer gear TF2 at the third forward speed 3RD, the fourth forward speed 4TH is achieved.

In this case, the torque of the input shaft IS is input to the first rotation shaft N1 through the first transfer gear TF1 by operation of the first clutch C1 and is input to the fourth rotation shaft N4 through the second transfer gear TF2.

Therefore, the rotation shafts form a fourth shift line SP4 by the gear ratios of the first transfer gear TF1 and the second transfer gear TF2, and D4 is output through the second rotation shaft N2 that is the output element.

[Fifth Forward Speed]

If the dog clutch DC returns to the neutral state and the second clutch C2 is operated at the fourth forward speed 4TH, the fifth forward speed 5TH is achieved.

In this case, the torque of the input shaft IS is input to the first rotation shaft N1 and the third rotation shaft N3 through the first transfer gear TF1 by operation of the first clutch C1 and the second clutch C2.

Therefore, the first and second planetary gear sets PG1 and PG2 become direct-coupling state, the rotation shafts form a fifth shift line SP5, and D5 is output through the second rotation shaft N2 that is the output element.

[Sixth Forward Speed]

The first clutch C1 that was operated at the fifth forward speed 5TH is released and the dog clutch DC is operably connected to the second transfer gear TF2 at the sixth forward speed 6TH.

In this case, the torque of the input shaft IS is input to the third rotation shaft N3 through the first transfer gear TF1 by operation of the second clutch C2 and is input to the fourth rotation shaft N4 through the second transfer gear TF2.

Therefore, the rotation shafts form a sixth shift line SP6 by the gear ratios of the first transfer gear TF1 and the second transfer gear TF2, and D6 is output through the second rotation shaft N2 that is the output element.

[Seventh Forward Speed]

If the dog clutch DC is released from the second transfer gear TF2 and is operably connected to the third transfer gear TF3 at the sixth forward speed 6TH, the seventh forward speed 7TH is achieved.

In this case, the torque of the input shaft IS is input to the third rotation shaft N3 through the first transfer gear TF1 by operation of the second clutch C2 and is input to the fourth rotation shaft N4 through the third transfer gear TF3.

Therefore, the rotation shafts form a seventh shift line SP7 by the gear ratios of the first transfer gear TF1 and the third transfer gear TF3, and D7 is output through the second rotation shaft N2 that is the output element.

[Eighth Forward Speed]

If the dog clutch DC returns to the neutral state and the second brake B2 is operated at the seventh forward speed 7TH, the eighth forward speed 8TH is achieved.

In this case, the torque of the input shaft IS is input to the third rotation shaft N3 through the first transfer gear TF1 by operation of the second clutch C2, and the fourth rotation shaft N4 is stopped by operation of the second brake B2.

Therefore, the rotation shafts form an eighth shift line SP8 and D8 is output through the second rotation shaft N2 that is the output element.

[Reverse Speed]

The first brake B1 is operated and the dog clutch DC is operably connected to the second transfer gear TF2 at the reverse speed REV.

In this case, the torque of the input shaft IS is input to the fourth rotation shaft N4 through the second transfer gear TF2, and the third rotation shaft N3 is stopped by operation of the first brake B1.

Therefore, the rotation shafts form a reverse shift line RS and REV is output through the second rotation shaft N2 that is the output element.

The planetary gear train according to the exemplary embodiment of the present invention can achieve eight forward speeds and one reverse speed by combining two planetary gear sets PG1 and PG2 being the simple planetary gear sets with three transfer gears TF1, TF2, and TF3 being the externally-meshed gears, four frictional elements C1, C2, B1, and B2, and the dog clutch DC.

Since the first, second, and third transfer gears TF1, TF2, and TF3 and the dog clutch DC are used, at least one planetary gear set and two frictional elements may be removed, compared with the planetary gear train. Therefore, manufacturing cost may be curtailed by reducing the number of components.

In addition, optimum gear ratios may be set due to ease of changing gear ratios by using the first, second, and third transfer gears TF1, TF2, and TF3 as well as the first and second planetary gear sets PG1 and PG2. Since the gear ratios can be changed according to target performance, starting performance, power delivery performance and fuel economy may be improved.

In addition, two frictional elements or one frictional element and the dog clutch are operated at each shift-speed, and one frictional element is released and another friction element is operated or only the dog clutch changes its operating state to shift to a neighboring shift-speed. Therefore, shift control condition is fully satisfied.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A planetary gear train of an automatic transmission for a vehicle comprising:
   an input shaft receiving torque;
   an output shaft disposed in parallel with and apart from the input shaft;
   a first planetary gear set having three rotation elements;
   a second planetary gear set having three rotation elements;
   a first rotation shaft directly connected to one rotation element of the first planetary gear set and one rotation element of the second planetary gear set, and selectively connected to the input shaft;
   a second rotation shaft directly connected to another rotation element of the second planetary gear set and directly connected to the output shaft;
   a third rotation shaft directly connected to another rotation element of the first planetary gear set and the other rotation element of the second planetary gear set, and selectively connected to the input shaft or to a transmission housing; and
   a fourth rotation shaft directly connected to the other rotation element of the first planetary gear set, and selectively connected to the input shaft through two paths or to the transmission housing.

2. The planetary gear train of claim 1, further comprising three transfer gears disposed respectively between the input shaft and the first and third rotation shafts and on the two paths.

3. The planetary gear train of claim 1, further comprising a dog clutch selectively transmitting torque of the input shaft to any one of the two paths or not transmitting either of the two paths.

4. The planetary gear train of claim 1, wherein each of the first and second planetary gear sets is a single pinion planetary gear set.

5. The planetary gear train of claim 1, wherein the first rotation shaft is connected to a first sun gear of the first planetary gear set and a second sun gear of the second planetary gear set,
   the second rotation shaft is connected to a second planet carrier of the second planetary gear set,
   the third rotation shaft is connected to a first planet carrier of the first planetary gear set and a second ring gear of the second planetary gear set, and
   the fourth rotation shaft is connected to a first ring gear of the first planetary gear set.

6. The planetary gear train of claim 2, wherein the three transfer gears comprise:
   a first transfer gear disposed between the input shaft and the first and third rotation shafts;
   a second transfer gear disposed on a first path of the two paths; and
   a third transfer gear disposed on a second path of the two paths.

7. The planetary gear train of claim 2, wherein gear ratios of the three transfer gears are different from each other.

8. The planetary gear train of claim 6, further comprising:
   a first clutch disposed between the first transfer gear and the first rotation shaft;
   a second clutch disposed between the first transfer gear and the third rotation shaft;
   a first brake disposed between the third rotation shaft and the transmission housing; and
   a second brake disposed between the fourth rotation shaft and the transmission housing.

9. The planetary gear train of claim 8, wherein the first, second, and third transfer gears and the first and second clutches are disposed at one side of the first planetary gear set, and the first and second brakes are disposed at the other side of the first planetary gear set.

10. A planetary gear train of an automatic transmission for a vehicle comprising:
    an input shaft receiving torque;
    an output shaft disposed in parallel with and apart from the input shaft;
    a first planetary gear set including a first sun gear, a first planet carrier, and a first ring gear as rotation elements thereof;
    a second planetary gear set including a second sun gear, a second planet carrier, and a second ring gear as rotation elements thereof and disposed adjacent to the first planetary gear set;
    a first rotation shaft directly connected to the first sun gear and the second sun gear and selectively connected to the input shaft;
    a second rotation shaft directly connected to the second planet carrier and directly connected to the output shaft;

a third rotation shaft directly connected to the first planet carrier and the second ring gear, and selectively connected to the input shaft or to a transmission housing;

a fourth rotation shaft directly connected to the first ring gear and selectively connected to the input shaft or to the transmission housing; and a dog clutch selectively connecting the input shaft to the fourth rotation shaft through two paths.

11. The planetary gear train of claim 10, wherein each of the first and second planetary gear sets is a single pinion planetary gear set.

12. The planetary gear train of claim 10, further comprising:

a first transfer gear disposed between the input shaft and the first and third rotation shafts;

a second transfer gear disposed on a first path of the two paths; and a third transfer gear disposed on a second path of the two paths.

13. The planetary gear train of claim 12, wherein gear ratios of the three transfer gears are different from each other.

14. The planetary gear train of claim 13, further comprising:

a first clutch disposed between the first transfer gear and the first rotation shaft;

a second clutch disposed between the first transfer gear and the third rotation shaft;

a first brake disposed between the third rotation shaft and the transmission housing; and a second brake disposed between the fourth rotation shaft and the transmission housing.

15. The planetary gear train of claim 14, wherein the first, second, and third transfer gears and the first and second clutches are disposed at one side of the first planetary gear set, and the first and second brakes are disposed at the other side of the first planetary gear set.

16. The planetary gear train of claim 14, wherein the dog clutch is adapted to selectively transmit torque of the input shaft to any one of the two paths or not to transmit either of the two paths.

* * * * *